(12) United States Patent
Takahashi et al.

(10) Patent No.: US 7,066,157 B2
(45) Date of Patent: Jun. 27, 2006

(54) SUPERCHARGE CONTROL APPARATUS AND SUPERCHARGE CONTROL METHOD FOR SUPERCHARGED INTERNAL COMBUSTION ENGINE

(75) Inventors: Yoshiyuki Takahashi, Kariya (JP); Yuji Narita, Kariya (JP); Hisanobu Suzuki, Toyota (JP)

(73) Assignees: Kabushiki Kaisha Toyota Jidoshokki (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 11/021,665

(22) Filed: Dec. 23, 2004

(65) Prior Publication Data

US 2005/0166593 A1  Aug. 4, 2005

(30) Foreign Application Priority Data

Dec. 24, 2003 (JP) .............................. 2003-428208

(51) Int. Cl.
F02B 33/44 (2006.01)
F02B 37/00 (2006.01)
F02B 37/12 (2006.01)
F02B 37/24 (2006.01)
F02D 23/00 (2006.01)

(52) U.S. Cl. .................... 123/559.1; 60/611; 60/612; 123/562

(58) Field of Classification Search ............ 123/559.1, 123/562; 60/605.1, 611, 612
See application file for complete search history.

(56) References Cited

U.S. PATENT DOCUMENTS

| 4,299,090 A | 11/1981 | Deutschmann | 60/612 |
| 5,090,204 A * | 2/1992 | Bonitz et al. | 123/562 |
| 5,201,790 A | 4/1993 | Mukai et al. | 60/612 |
| 5,351,486 A | 10/1994 | Yoshioka et al. | 60/612 |
| 5,845,495 A | 12/1998 | Schray et al. | 60/612 |
| 6,202,415 B1 * | 3/2001 | Lohmann et al. | 60/612 |
| 6,314,737 B1 * | 11/2001 | Springer et al. | 60/612 |
| 6,357,234 B1 | 3/2002 | Gladden | 60/612 |
| 6,442,936 B1 * | 9/2002 | Houtz | 123/562 |
| 6,602,057 B1 * | 8/2003 | Saxena et al. | 417/286 |
| 6,755,022 B1 * | 6/2004 | Kim et al. | 60/608 |
| 6,938,420 B1 * | 9/2005 | Kawamura et al. | 123/562 |
| 2004/0020205 A1 * | 2/2004 | Mailander | 60/612 |

FOREIGN PATENT DOCUMENTS

| DE | 198 10 174 C1 | 4/1999 |
| GB | 2 355 499 | 4/2001 |
| JP | 61-277818 | 12/1986 |
| JP | 02-305322 | 12/1990 |
| JP | 05-195837 | 8/1993 |
| JP | 2001/342840 | 12/2001 |

* cited by examiner

Primary Examiner—Sheldon J Richter
(74) Attorney, Agent, or Firm—Woodcock Washburn LLP

(57) ABSTRACT

A detecting device detects boost condition of each of a plurality of superchargers. The detecting device includes at least two of a pressure ratio detecting unit, which detects the ratio of the pressure downstream each supercharger to the pressure upstream each supercharger; an air flow rate detecting unit, which detects the flow rate of air passing through each supercharger; and a rotational speed detecting unit, which detects the rotational speed of each supercharger. When it is determined that the boost condition of only part of the superchargers is within the surging area, a control unit increases the air flow rate of the supercharger, the boost condition of which is determined to be in the surging area. Therefore, the limitation of the flow rate of air supply is raised.

16 Claims, 4 Drawing Sheets

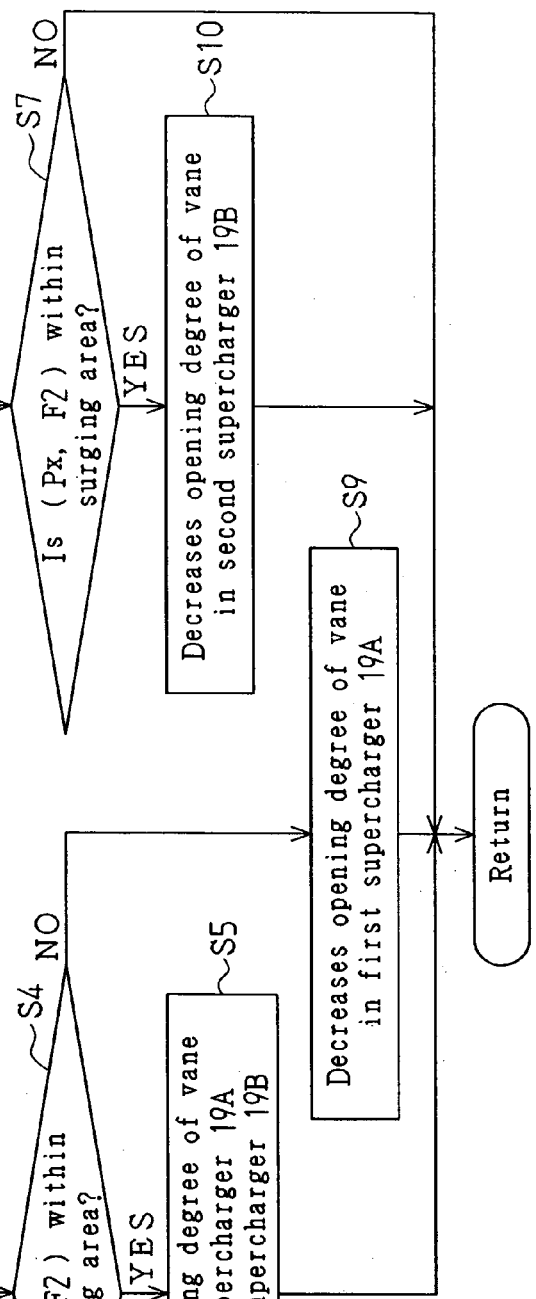
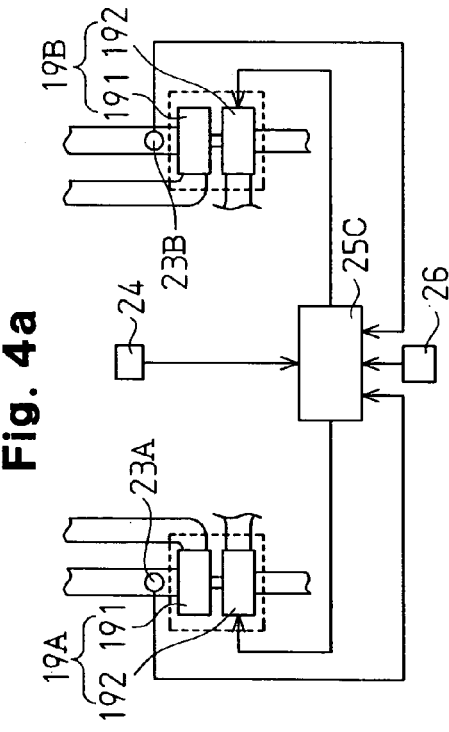
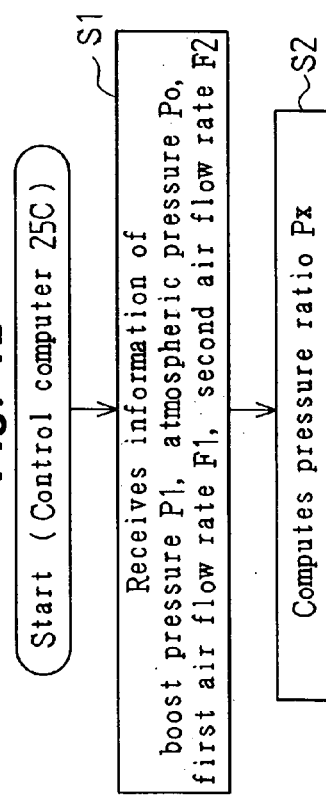

SUPERCHARGE CONTROL APPARATUS AND SUPERCHARGE CONTROL METHOD FOR SUPERCHARGED INTERNAL COMBUSTION ENGINE

BACKGROUND OF THE INVENTION

The present invention relates to a supercharge control apparatus and a supercharge control method for a supercharged internal combustion engine that converges intake air fed from superchargers and supplies the intake air to cylinders.

A supercharger for improving the intake efficiency of an internal combustion engine includes an exhaust-gas driven turbocharger, which supercharges cylinders by an energy of exhaust-gas (for example, Japanese Laid-Open Patent Publication No. 2001-342840, Japanese Laid-Open Patent Publication No. H02-305322). The turbocharger includes a variable displacement turbocharger that adjusts the flow velocity of exhaust gas by selectively opening and closing a vane in a turbine. Adjusting the flow velocity of exhaust gas controls the boost pressure.

When the ratio of the pressure downstream-the compressor to the pressure upstream the compressor becomes excessively high in the turbocharger, surge occurs and intake air flows backward. According to the invention disclosed in Japanese Laid-Open Patent Publication No. 2001-342840, which uses a variable displacement turbocharger, the ratio of the pressure downstream the compressor to the pressure upstream the compressor and the flow rate of air passing through the compressor are detected. The pressure ratio is controlled in accordance with the detected information such that the pressure ratio and the air flow rate do not exceed a surging line.

The publication No. 2001-342840 discloses a supercharge control for a single super charger. The publication No. H02-305322 discloses a supercharge control when converging air fed from several superchargers and supplying the air to cylinders.

In a case where the air fed from several superchargers are converged and supplied to cylinders, if the supercharging capability of each supercharger differs from one another, the supercharger having a low supercharging capability (that is, the supercharger that supplies less amount of air to the cylinder) is likely to cause a surge. This is because even when the supercharging capability of each supercharger differs from one another, the pressure ratio of each supercharger is substantially the same. That is, as compared to the supercharger that has a high supercharging capability and a high flow rate of air supply, the boost condition represented by the combination of the pressure ratio and the air flow rate tends to easily exceed the surging line in the supercharger that has a low supercharging capability and a low flow rate of air supply although with the same pressure ratio. Therefore, in a case where intake air fed from several superchargers are converged and supplied to the cylinders, there is a limitation in increasing the pressure ratio to increase the flow rate air supply to the cylinders due to the variation of the supercharging capability of the supercharges.

SUMMARY OF THE INVENTION

Accordingly, it is an objective of the present invention to raise the limitation of the flow rate of air supply in a case where the air fed from several supercharges are converged and supplied to cylinders.

To achieve the above-mentioned objective, the present invention provides a supercharge control apparatus for an internal combustion engine. The internal combustion engine includes a plurality of superchargers. Air fed from the superchargers are combined and supplied to the internal combustion engine. The apparatus includes a detecting device for detecting boost condition of each of the superchargers. The detecting device includes at least two of a pressure ratio detecting unit, which detects the ratio of the pressure downstream each supercharger to the pressure upstream each supercharger, an air flow rate detecting unit, which detects the flow rate of air passing through each supercharger, and a rotational speed detecting unit, which detects the rotational speed of each supercharger. A determining unit determines whether the boost condition is within a predetermined surging area. When it is determined that the boost condition of only part of the superchargers is within the surging area, a control unit increases the air flow rate of the supercharger, the boost condition of which is determined to be in the surging area.

Another aspect of the present invention provides a supercharge control apparatus for an internal combustion engine. The apparatus includes a detecting device for detecting boost condition of each of the superchargers; a determining unit, which determines whether the boost condition is within a predetermined surging area; and a control unit. when it is determined that the boost condition of only part of the superchargers is within the surging area, the control unit decreases the air flow rate of the supercharger other than the part of the superchargers, the boost condition of which is determined to be in the surging area.

Another aspect of the present invention provides a supercharge control method for an internal combustion engine, which includes a plurality of superchargers. The method includes combining air fed from the superchargers and supplying the air to the internal combustion engine; and detecting a parameter representing boost condition of each of the superchargers. The parameter includes at least two of the ratio of the pressure downstream each supercharger to the pressure upstream each supercharger, the flow rate of air passing through each supercharger, and the rotational speed of each supercharger. The method includes determining whether the boost condition is within a predetermined surging area; and when it is determined that the boost condition of only part of the superchargers is within the surging area, increasing the air flow rate of the supercharger, the boost condition of which is determined to be in the surging area.

Another aspect of the present invention provides a supercharge control method for an internal combustion engine, which includes a plurality of superchargers. The method includes combining air fed from the superchargers and supplying the air to the internal combustion engine; and detecting a parameter representing boost condition of each of the superchargers. The parameter includes at least two of the ratio of the pressure downstream each supercharger to the pressure upstream each supercharger, the flow rate of air passing through each supercharger, and the rotational speed of each supercharger. The method includes determining whether the boost condition is within a predetermined surging area; and when it is determined that the boost condition of only part of the superchargers is within the surging area, decreasing the air flow rate of the supercharger other than the part of the superchargers, the boost condition of which is determined to be in the surging area.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is a block diagram illustrating a supercharge control apparatus according to a second embodiment of the present invention;

FIG. 4(b) is a flowchart showing a surge prevention control program executed by the supercharge control apparatus of FIG. 4(a);

DETAILED DESCRIPTION OF THE PREFERRED EMBODIMENTS

A first embodiment of the present invention will now be described with reference to FIGS. 1–3.

Figure 1:
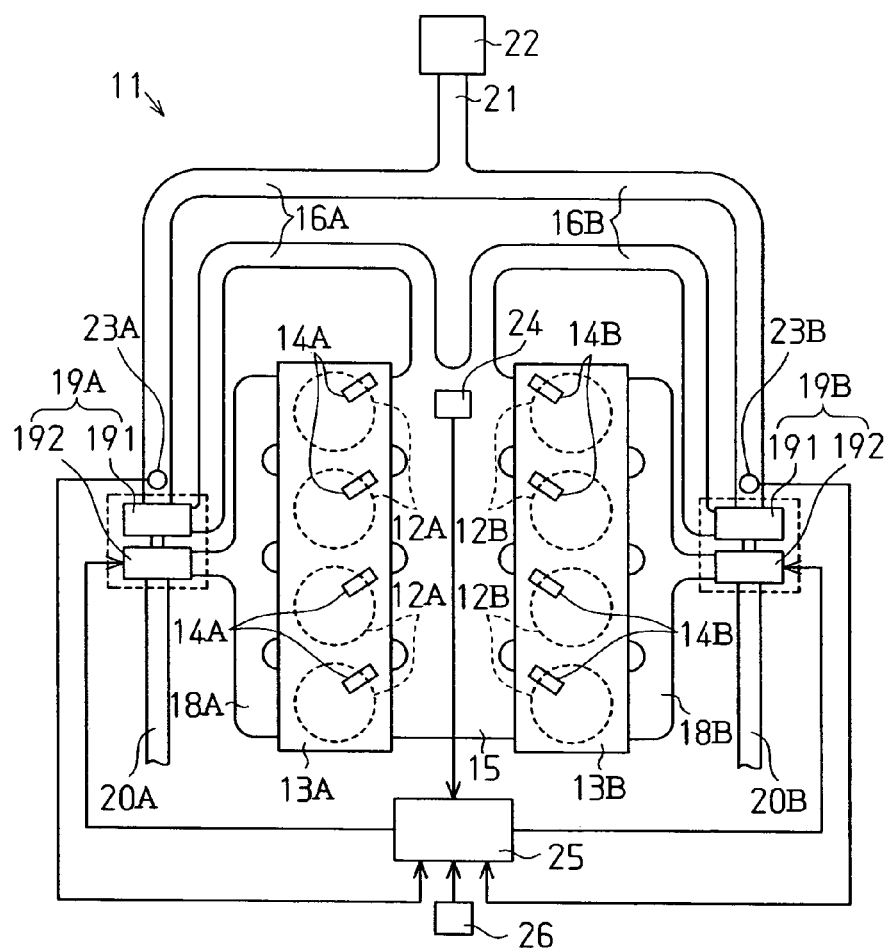
FIG. 1 is an entire block diagram illustrating a supercharge control apparatus according to a first embodiment of the present invention.

As shown in FIG. 1, an internal combustion engine 11 includes a first group of cylinders 12A and a second group of cylinders 12B. Fuel injection valves 14A are attached to a cylinder head 13A corresponding to the first group of cylinders 12A. Each fuel injection valve 14A corresponds to one of the cylinders 12A. Fuel injection valves 14B are attached to a cylinder head 13B corresponding to the second group of cylinders 12B. Each fuel injection valve 14B corresponds to one of the cylinders 12B. The fuel injection valves 14A, 14B inject fuel into the cylinders 12A, 12B.

The cylinder heads 13A, 13B are connected to an intake manifold 15. The intake manifold 15 is connected to branch intake passages 16A, 16B. A compressor unit 191 of a first supercharger 19A is located in the branch intake passage 16A and a compressor unit 191 of a second supercharger 19B is located in the branch intake passage 16B. The first and second superchargers 19A, 19B are known variable nozzle turbochargers operated by exhaust gas flow.

The branch intake passages 16A, 16B are connected to a main intake passage 21. The air drawn into the main intake passage 21 branches into the branch intake passages 16A, 16B. The air flowing through the branch intake passage 16A and the air flowing through the branch intake passage 16B are converged in the intake manifold 15. That is, the intake air fed from the compressor units 191 of the first and second supercharges 19A, 19B are converged in the intake manifold 15 and supplied to the cylinders 12A, 12B.

The cylinder head 13A is connected to an exhaust manifold 18A and the cylinder head 13B is connected to an exhaust manifold 18B. The exhaust manifold 18A is connected to an exhaust passage 20A via a turbine 192 of the first supercharger 19A. The exhaust manifold 18B is connected to an exhaust passage 20B via a turbine 192 of the second supercharger 19B.

An air flow rate detecting unit, which is an air flow meter 23A in this embodiment, is located in the branch intake passage 16A upstream the compressor unit 191 of the first supercharger 19A (upstream of the intake passage). An air flow rate detecting unit, which is an air flow meter 23B in this embodiment, is located in the branch intake passage 16B upstream of the compressor unit 191 of the second supercharger 19B (upstream of the intake passage). The air flow meter 23A detects the flow rate of air in the branch intake passage 16A and the air flow meter 23B detects the flow rate of air in the branch intake passage 16B.

A pressure sensor 24 is located in the intake manifold 15. A pressure detecting unit, which is the pressure sensor 24 in this embodiment, detects the pressure (boost pressure) in the intake manifold 15 (downstream of the first and second superchargers 19A, 19B).

The information of the first air flow rate F1 detected by the air flow meter 23A, the information of the second air flow rate F2 detected by the air flow meter 23B, and the information of the boost pressure P1 detected by the pressure sensor 24 are sent to a control computer 25. The control computer 25 receives the information of the atmospheric pressure Po detected by an atmospheric pressure detecting unit, which is an atmospheric pressure sensor 26 in this embodiment.

Figure 3:
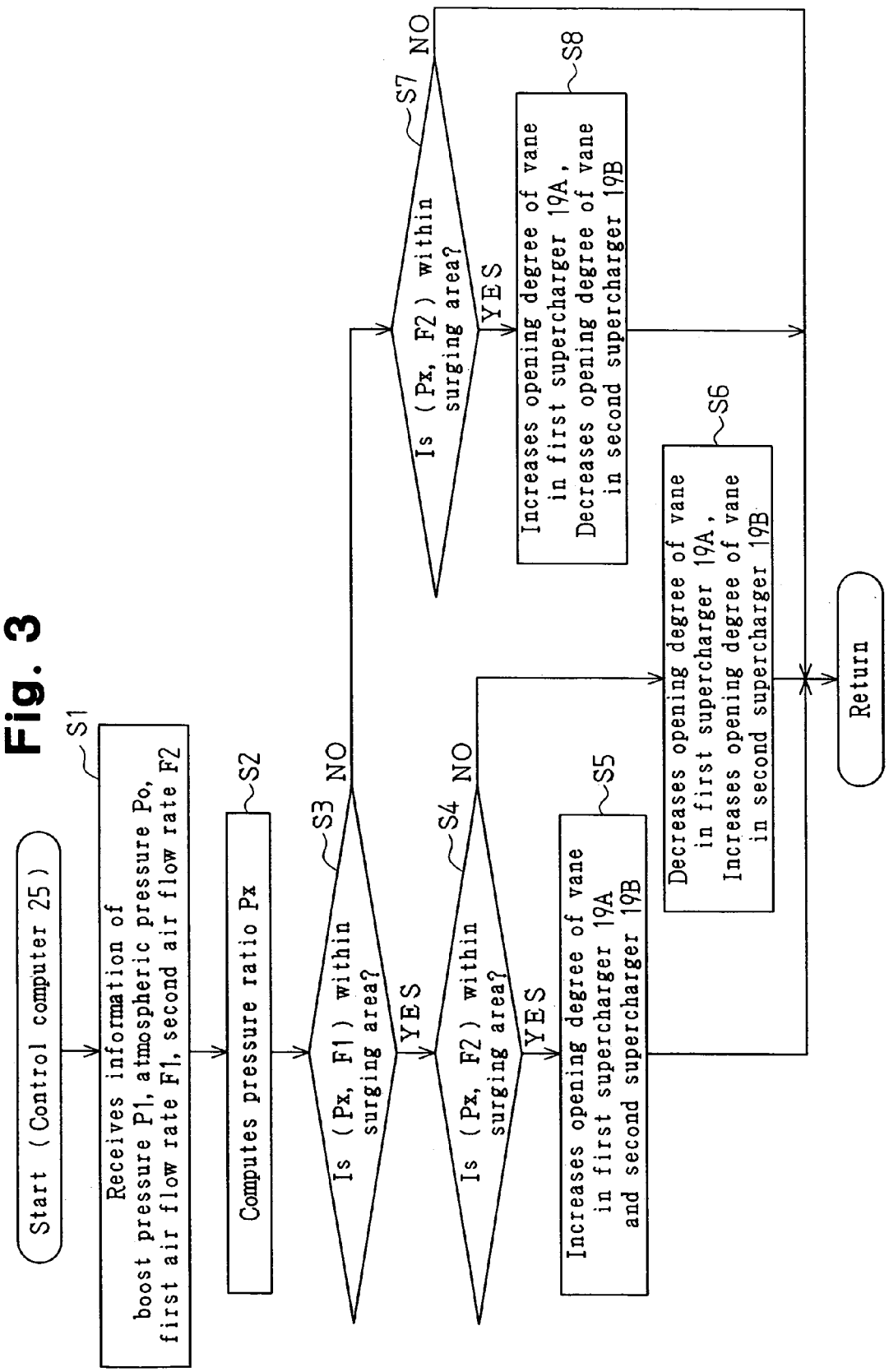
FIG. 3 is a flowchart showing a surge prevention control program executed by the supercharge control apparatus of FIG. 1.

The control computer 25 controls the opening degree of a vane in the turbine 192 of each supercharger 19A, 19B in accordance with a surge prevention control program shown in the flowchart of FIG. 3. The surge prevention control will now be described with reference to the flowchart of FIG. 3. The surge prevention control program shown in the flowchart is repeatedly performed at a predetermined control cycle.

At step S1, the control computer 25 receives the information of the boost pressure P1, the atmospheric pressure Po, the first air flow rate F1, and the second air flow rate F2 at a predetermined control cycle. At step S2, the control computer 25 computes the pressure ratio Px (Px=P1/Po) in accordance with the received boost pressure P1 and the atmospheric pressure Po. At step S3, the control computer 25 determines whether the boost condition represented by the combination (Px, F1) of the computed pressure ratio Px (Px=P1/Po) and the air flow rate F1 is within a surging area E. Hereinafter, the combination (Px, F) is also referred to as the boost condition (Px, F1).

Figure 2:
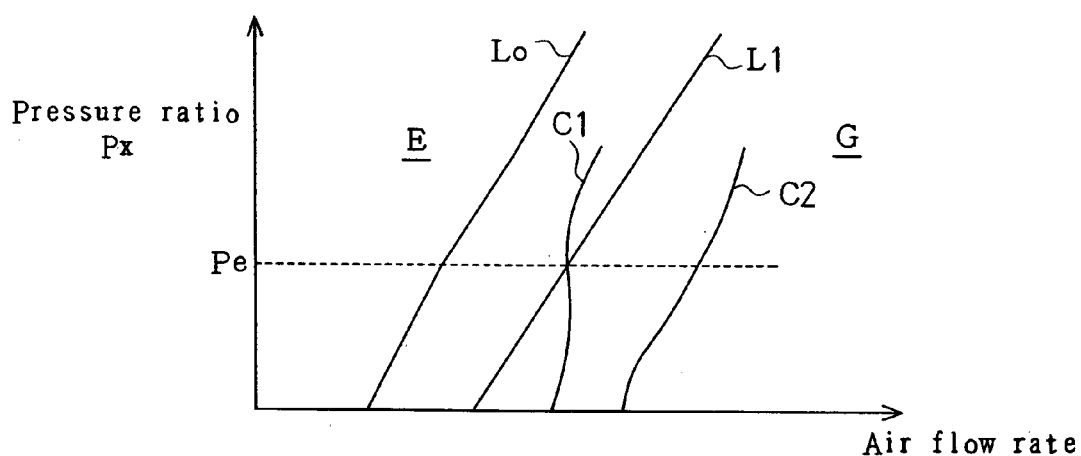
FIG. 2 is a graph explaining a supercharge control performed by the supercharge control apparatus shown in FIG. 1.

FIG. 2 is a graph showing the surging area E with the pressure ratio Px (Px=P1/Po) and the air flow rate (the flow rate of air supplied from the first supercharger 19A or the second supercharger 19B to the cylinders 12A or 12B) set as variables. The horizontal axis represents the air flow rate and the vertical axis represents the pressure ratio Px (Px=P1/Po). A surging line L1 is included in the surging area E. The area above the line Lo is where a surge actually occurs. The area between the line Lo and the surging line L1 is a relief area for avoiding the occurrence of a surge. The area below the surging line L1 is a non-surging area G.

That is, the boost condition is represented by a coordinate in a two-dimensional coordinate system defined by the pressure ratio Px and the air flow rate F1, F2. The surging line L1, which divides the coordinate system into the surging area E and the non-surging area G, is located in the coordinate system. The surging line L1 is set such that under the same pressure ratio Px, the value of the air flow rate in the surging area E is smaller than that in the non-surging area G, and under the same air flow rate, the value of the pressure ratio Px included in the surging area E is greater than that in the non-surging area G.

If the decision outcome of step S3 is YES, that is, if it is determined that the boost condition (Px, F1) is within the surging area E, the control computer 25 proceeds to step S4 and determines whether the boost condition represented by the combination (Px, F2) of the pressure ratio Px (Px=P1/Po) and the air flow rate F2 is within the surging area E. Hereinafter, the combination (Px, F2) is also referred to as the boost condition (Px, F2).

If the decision outcome of step S4 is YES, that is, if it is determined that the boost condition (Px, F1) and the boost condition (Px, F2) are within the surging area E, the control computer 25 proceeds to step S5 and increases the opening degree of the vane in each of the first supercharger 19A and the second supercharger 19B. Increasing the opening degree of the vane decreases the rotational speed of the associated turbine 192. When the opening degree of the vane in the first supercharger 19A is increased, the air flow rate in the first supercharger 19A is decreased. When the opening degree of the vane in the second supercharger 19B is increased, the air flow rate in the second supercharger 19B is decreased. Decreasing the air flow rate of the first and second superchargers 19A, 19B decreases the boost pressure P1 and decreases the pressure ratio Px. Decreasing the pressure ratio Px shifts the boost condition (Px, F1) and the boost condition (Px, F2) from the surging area E to the non-surging area G.

If the decision outcome of step S4 is NO, that is, if it is determined that the boost condition (Px, F1) is within the surging area E and the boost condition (Px, F2) is not within the surging area E, the control computer 25 proceeds to step S6 and decreases the opening degree of the vane in the first supercharger 19A and increases the opening degree of the vane in the second supercharger 19B. Decreasing the opening degree of the vane increases the rotational speed of the turbine 192, which increases the air flow rate. Increasing the air flow rate of the first supercharger 19A shifts the boost condition (Px, F1) from the surging area E to the non-surging area G. Decreasing the air flow rate of the second supercharger 19B causes the boost condition (Px, F2) to approach the surging area E.

If the decision outcome of step S3 is NO, that is, if it is determined that the boost condition (Px, F1) is not within the surging area E, the control computer 25 proceeds to step S7 and determines whether the boost condition (Px, F2) is within the surging area E.

If the decision outcome of step S7 is YES, that is, if it is determined that the boost condition (Px, F1) is not within the surging area E and the boost condition (Px, F2) is within the surging area E, the control computer 25 proceeds to step S8 and increases the opening degree of the vane in the first supercharger 19A and decreases the opening degree of the vane in the second supercharger 19B. When the opening degree of the vane in the first supercharger 19A is increased, the air flow rate in the first supercharger 19A is decreased. When the opening degree of the vane in the second supercharger 19B is decreased, the air flow rate in the second supercharger 19B is increased. Decreasing the air flow rate of the first supercharger 19A causes the boost condition (Px, F1) to approach the surging area E. Increasing the air flow rate of the second supercharger 19B shifts the boost condition (Px, F2) from the surging area E to the non-surging area G.

If the decision outcome of step S7 is NO, that is, if it is determined that the boost condition (Px, F1) is not within the surging area E and the boost condition (Px, F2) is not within the surging area E, the control computer 25 proceeds to step S1. After executing steps S5, S6, and S8, the control computer 25 proceeds to step S1.

The control computer 25 is a pressure ratio computing unit, which computes the ratio between the atmospheric pressure detected by the atmospheric pressure detecting unit and the pressure detected by the pressure detecting unit. The pressure sensor 24, the atmospheric pressure sensor 26, and the control computer 25 constitute a pressure ratio detecting unit, which detects the ratio of the pressure downstream the supercharger to the pressure upstream the supercharger. The control computer 25 is a determining unit, which determines whether the boost condition represented by the pressure ratio Px detected by the pressure ratio detecting unit and the air flow rate F1, F2 detected by the air flow meters is within the predetermined surging area E. The control computer 25 is a control unit that, when it is determined that the boost condition of only one of the superchargers 19A, 19B is within the surging area E, increases the air flow rate of the supercharger, the boost condition of which is determined to be in the surging area E. In this embodiment, the pressure ratio detecting unit and the air flow rate detecting unit constitute a detecting device for detecting the boost condition of each of the superchargers 19A, 19B. The supercharge control apparatus of the preferred embodiment includes the detecting device, the determining unit, and the control unit.

The first embodiment provides the following advantages.

(1—1) When increasing the air flow rate of the supercharger that has been determined that the boost condition, which is represented by the combination of the pressure ratio Px and the air flow rate F1, F2, is in the surging area E, the boost condition of the supercharger shifts from the surging area E to the non-surging area G.

A curved line C1 in the graph of FIG. 2 represents an example of the variation of the boost condition (Px, F1) for the first supercharger 19A at a given engine speed (for example, 3000 rpm). A curved line C2 represents an example of the variation of the boost condition (Px, F2) for the second supercharger 19B at the given engine speed (3000 rpm). The curved line C1 reflects the supercharging capability of the first supercharger 19A and the curved line C2 reflects the supercharging capability of the second supercharger 19B. FIG. 2 shows a case where the supercharging capability of the first supercharger 19A is inferior to the supercharging capability of the second supercharger 19B. According to the example of FIG. 2, the curved line C1 corresponding to the first supercharger 19A shows that there is a state where the air flow rate does not increase although the pressure ratio Px is increased, and the boost condition enters the surging area E at a significantly low pressure ratio Pe compared to the curved line C2. This is because there is the second supercharger 19B that has a higher supercharging capability than the first supercharger 19A.

In the example of FIG. 2, when the pressure ratio Px is greater than or equal to Pe, the boost condition (Px, F1) of the first supercharger 19A is in the surging area E. In this state, the control computer 25 performs the process of step S6 in FIG. 3, that is, the control computer 25 decreases the opening degree of the vane in the first supercharger 19A and increases the opening degree of the vane in the second supercharger 19B. Decreasing the opening degree of the vane in the first supercharger 19A while increasing the opening degree of the vane in the second supercharger 19B permits the air flow rate in the first supercharger 19A to be increased without changing the pressure ratio Px (boost Pressure P1) greatly. That is, the boost condition (Px, F1)

that is in the surging area E shifts from the surging area E to the non-surging area G by the process of step S6 in FIG. 3. The boost condition is mainly shifted in a direction of the horizontal axis in the graph of FIG. 2. Such a shifting process is available because of the structure in which the air fed from the first and second supercharges 19A, 19B are converged in the intake manifold 15. That is, the branch intake passages 16A, 16B downstream of the first and second superchargers 19A, 19B are connected to each other via the intake manifold 15. The intake passages downstream of the first and second supercharges 19A, 19B refer to the intake manifold 15 and the branch intake passages 16A, 16B downstream of the first and second superchargers 19A, 19B.

When the boost condition (Px, F1) is shifted from the surging area E to the non-surging area G by increasing the air flow rate, the limit of the pressure ratio of the supercharger 19A having a low supercharging capability can be increased to be greater than the pressure ratio Pe. When the pressure ratio of the supercharger 19A is under the limit, surge is prevented from occurring. That is, the control to increase the air flow rate in the supercharger 19A having a low supercharging capability in accordance with the detection result that the boost condition (Px, F1) has entered the surging area E raises the limit of the pressure ratio of the supercharger 19A having a low supercharging capability and enables to raise the limit of the flow rate of air supply to the cylinders 12A. This improves the output and exhaust performance of the internal combustion engine 11.

In contrast, in a case where the curved line C1 reflects the supercharging capability of the second supercharger 19B and the curved line C2 reflects the supercharging capability of the first supercharger 19A, the process of step S8 of FIG. 3 is performed. That is, the opening degree of the vane in the second supercharger 19B is decreased and the opening degree of the vane in the first supercharger 19A is increased. Decreasing the opening degree of the vane in the second supercharger 19B while increasing the opening degree of the vane in the first supercharger 19A permits the air flow rate in the second supercharger 19B to be increased without changing the pressure ratio Px (boost Pressure P1) greatly. That is, the boost condition (Px, F2) that is in the surging area E shifts from the surging area E to the non-surging area G by the process of step S8 in FIG. 3. The boost condition is mainly shifted in a direction of the horizontal axis in the graph of FIG. 2.

(1–2) When the pressure ratio Px is changed, the air-fuel ratio changes, which is undesirable. When it is determined that the boost condition (Px, F1) is within the surging area E, the air flow rate of the first supercharger 19A is increased and the air flow rate of the second supercharger 19B is decreased. As compared to a case where the air flow rate of only the first supercharger 19A that has been made decision is increased, controlling the air flow rate of the first and second superchargers 19A, 19B reduces the increase of the pressure ratio Px. That is, the fluctuation of the air-fuel ratio is suppressed by decreasing the fluctuation of the pressure ratio Px.

A second embodiment of the present invention will now be described with reference to FIGS. 4(a) and 4(b). Same reference numerals are used for those components, which are the same as the corresponding components of the first embodiment.

A control computer 25C according to the second embodiment controls the opening degree of the vane in the turbine 192 of each supercharger 19A, 19B in accordance with the surge prevention control program shown in the flowchart of FIG. 4(b).

The surge prevention control program of the second embodiment differs from the first embodiment in that steps S6, S8 of the surge prevention control program according to the first embodiment are replaced with steps S9, S10. The steps S9, S10 will be described below.

If the decision outcome of step S4 is NO, that is, if it is determined that the boost condition (Px, F1) is within the surging area E and the boost condition (Px, F2) is not within the surging area E, the control computer 25C proceeds to step S9 and decreases the opening degree of the vane in the first supercharger 19A. Decreasing the opening degree of the vane in the first supercharger 19A increases the air flow rate of the first supercharger 19A. Increasing the air flow rate of the first supercharger 19A causes the boost condition (Px, F1) to shift from the surging area E to the non-surging area G.

If the decision outcome of step S7 is YES, that is, if it is determined that the boost condition (Px, F1) is not within the surging area E and the boost condition (Px, F2) is within the surging area E, the control computer 25C proceeds to step S10 and decreases the opening degree of the vane in the second supercharger 19B. Decreasing the opening degree of the vane in the second supercharger 19B increases the air flow rate of the second supercharger 19B. Increasing the air flow rate of the second supercharger 19B causes the boost condition (Px, F2) to shift from the surging area E to the non-surging area G.

If the decision outcome of step S7 is NO, that is, if it is determined that the boost condition (Px, F1) is not within the surging area E and the boost condition (Px, F2) is not within the surging area E, the control computer 25C proceeds to step S1. After executing steps S5, S9, and S10, the control computer 25C proceeds to step S1.

The control computer 25C is a control unit, which increases the air flow rate of the supercharger the boost condition of which is determined to be in the surging area E.

According to the second embodiment, when only the boost condition (Px, F1) of the first supercharger 19A is within the surging area E, only the air flow rate of the first supercharger 19A is increased to shift the boost condition (Px, F1) from the surging area E to the non-surging area G.

Similarly, when only the boost condition (Px, F2) of the second supercharger 19B is in the surging area E, only the air flow rate of the second supercharger 19B is increased to shift the boost condition (Px, F2) from the surging area E to the non-surging area G.

In such a control, the pressure ratio Px is increased. However, the limit of the pressure ratio of the supercharger having a low supercharging capability (for example, the supercharger 19A) can be increased higher than the pressure ratio Pe (see FIG. 2). That is, the control to increase the air flow rate in the supercharger having a low supercharging capability (for example, the supercharger 19A) in accordance with the detection result that the boost condition has entered the surging area E raises the limit of the pressure ratio of the supercharger having a low supercharging capability and enables to raise the limit of the flow rate of air supply to the cylinders 12A and 12B.

Figure 5A:
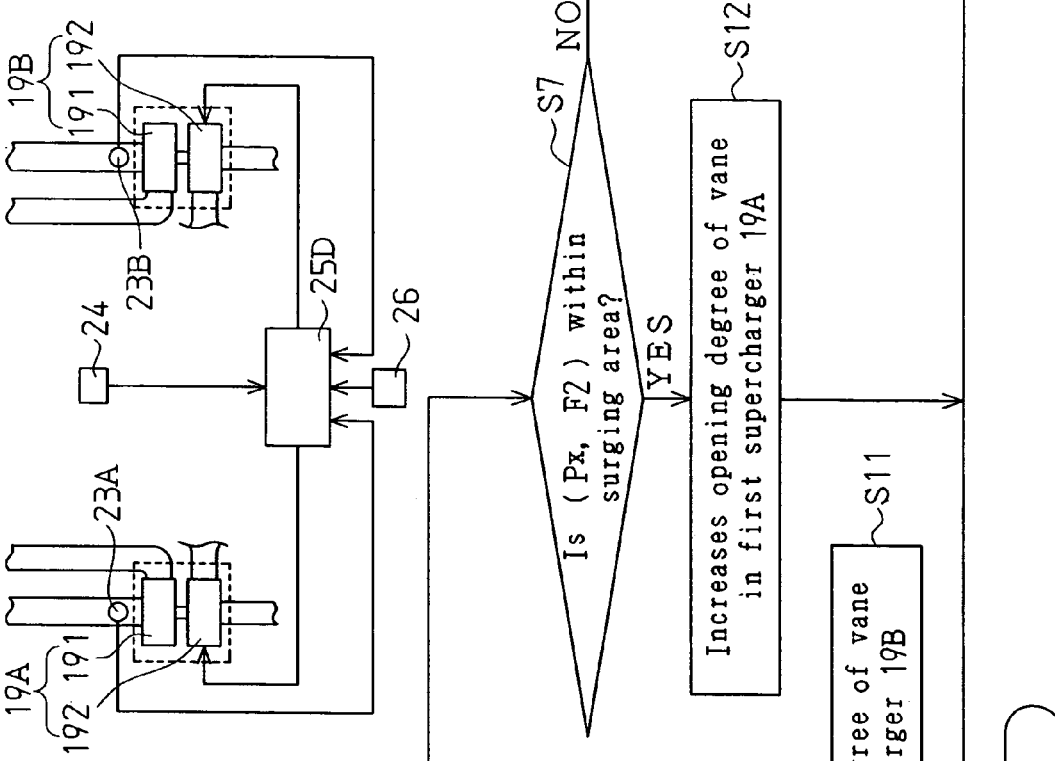
FIG. 5(a) is a block diagram illustrating a supercharge control apparatus according to a third embodiment of the present invention.

A third embodiment of the present invention will now be described with reference to FIGS. 5(a) and 5(b). Same reference numerals are used for those components, which are the same as the corresponding components of the first embodiment.

Figure 5B:
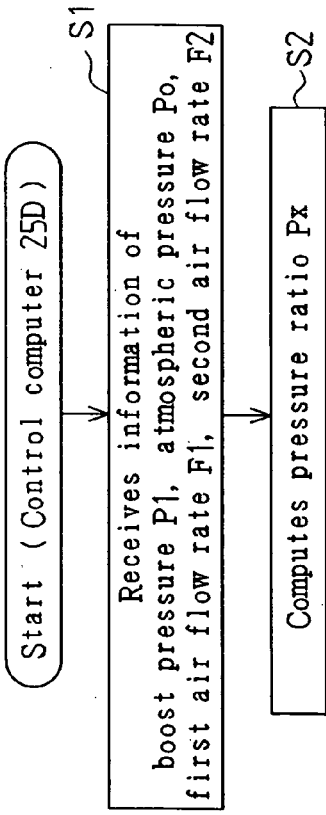
FIG. 5(b) is a flowchart showing a surge prevention control program executed by the supercharge control apparatus of FIG. 5(a).

A control computer 25D according to the third embodiment controls the opening degree of the vane in the turbine 192 of each supercharger 19A, 19B in accordance with the surge prevention control program shown in the flowchart of FIG. 5(b).

The surge prevention control program of the third embodiment differs from that of the first embodiment in that steps S6, S8 of the surge prevention control program according to the first embodiment are replaced with steps S1, S12. The steps S11, S12 will be described below.

If the decision outcome of step S4 is NO, that is, if it is determined that the boost condition (Px, F1) is within the surging area E and the boost condition (Px, F2) is not within the surging area E, the control computer 25D proceeds to step S11 and increases the opening degree of the vane in the second supercharger 19B. Increasing the opening degree of the vane in the second supercharger 19B decreases the air flow rate of the second supercharger 19B. Decreasing the air flow rate of the second supercharger 19B causes the boost condition (Px, F2) to approach the surging area E and decreases the pressure ratio Px. Decreasing the pressure ratio Px causes the boost condition (Px, F1) of the first supercharger 19A to shift from the surging area E to the non-surging area G.

If the decision outcome of step S7 is YES, that is, if it is determined that the boost condition (Px, F1) is not within the surging area E and the boost condition (Px, F2) is within the surging area E, the control computer 25D proceeds to step S12 and increases the opening degree of the vane in the first supercharger 19A. Increasing the opening degree of the vane in the first supercharger 19A decreases the air flow-rate of the first supercharger 19A. Decreasing the air flow rate of the first supercharger 19A causes the boost condition (Px, F1) to approach the surging area E and decreases the pressure ratio Px. Decreasing the pressure ratio Px causes the boost condition (Px, F2) of the second supercharger 19B to shift from the surging area E to the non-surging area G.

If the decision outcome of step S7 is NO, that is, if it is determined that the boost condition (Px, F1) is not within the surging area E and the boost condition (Px, F2) is not within the surging area E, the control computer 25D proceeds to step S1. After executing steps S5, S11, and S12, the control computer 25D proceeds to step S1.

The control computer 25D is a control unit, which decreases the air flow rate of the supercharger other than the one the boost condition of which is determined to be in the surging area E.

According to the third embodiment, when only the boost condition (Px, F1) of the first supercharger 19A is within the surging area E, only the air flow rate of the second supercharger 19B is decreased to shift the boost condition (Px, F1) from the surging area E to the non-surging area G. Similarly, when only the boost condition (Px, F2) of the second supercharger 19B is in the surging area E, only the air flow rate of the first supercharger 19A is decreased to shift the boost condition (Px, F2) from the surging area E to the non-surging area G.

The control to decrease the pressure ratio Px by decreasing the air flow rate of the supercharger other than that the boost condition of which is within the surging area E can raise the limit of the pressure ratio of the supercharger having a low supercharging capability (for example, the supercharger 19A) higher than the pressure ratio Pe (see FIG. 2). That is, the control to decrease the air flow rate of the supercharger having a high supercharging capability (for example, the supercharger 19B) in accordance with the detection result that the boost condition of the supercharger having a low supercharging capability has entered the surging area E raises the limit of the pressure ratio of the supercharger having a low supercharging capability and enables to raise the limit of the flow rate of air supply to the cylinders 12A and 12B.

The invention may be embodied in the following forms.

(1) According to the first embodiment, when decreasing the opening degree of the vane in the supercharger having a low supercharging capability, the opening degree of the supercharger having a high supercharging capability may be increased to cancel the increase of the air flow rate of the supercharger having a low supercharging capability. This substantially eliminates the fluctuation of the pressure ratio Px.

(2) According to the first embodiment, the pressure in the branch intake passage 16A downstream the first supercharger 19A and the pressure in the branch intake passage 16B downstream the second supercharger 19B may be detected by separate pressure sensors.

(3) A constant value set in advance as the information of the atmospheric pressure may be used as the value of the atmospheric pressure Po. In this case, the atmospheric pressure sensor 26 is unnecessary.

(4) The present invention may be embodied in a supercharge control apparatus of an internal combustion engine equipped with three or more superchargers.

(5) In the first embodiment, the pressure ratio Px is computed in accordance with the atmospheric pressure Po and the pressure in the intake passage downstream the supercharger 19A, 19B. However, instead of the atmospheric pressure, the pressure in the intake passage immediately upstream the supercharger 19A, 19B may be detected to compute the pressure ratio Px. In some internal combustion engine, a throttle valve is located in a main passage immediately after an air cleaner. In this case, it is difficult to determine the surging area using the atmospheric pressure except when the throttle valve is fully open. However, by measuring and using the pressure in the branch intake passage 16A, 16B upstream the compressor unit 191, for example, the pressure ratio that can determine the surging area may be computed regardless of the presence or absence of the throttle valve.

(6) According to the first to third embodiments, the determination of the surging area E and the non-surging area G is performed in accordance with the air flow rate F1, F2 and the pressure ratio Px. That is, the detecting device for detecting the boost condition of each of the superchargers 19A, 19B is constituted by the pressure ratio detecting unit and the air flow rate detecting unit. In other words, the parameter that represent the boost condition of each of the superchargers 19A, 19B includes the pressure ratio Px and the air flow rate F1, F2 that passes through each of the superchargers 19A, 19B. However, the determination of the area may be performed using other information. More specifically, when a rotational speed detecting unit, which is a rotational speed sensor, for detecting the rotational speed of each supercharger 19A, 19B is provided, the rotational speed may be used for determining the area E, G. That is, the determination of the surging area E and the non-surging area G may be performed using the combination of the rotational speed of the supercharger 19A, 19B and the air flow rate F1, F2, or the rotational speed of the supercharger 19A, 19B and the pressure ratio Px. That is, the detecting device includes at least two of the pressure ratio detecting unit, the air flow rate detecting unit, and the rotational speed detecting unit. In other words, the parameter showing the boost condition of each of the superchargers 19A, 19B includes at least two of the pressure ratio Px, the air flow rate F1, F2 of the supercharger 19A or 19B, and the rotational speed of the supercharger 19A or 19B.

The present examples and embodiments are to be considered as illustrative and not restrictive and the invention is not to be limited to the details given herein, but may be modified within the scope and equivalence of the appended claims.

The invention claimed is:

1. A supercharge control apparatus for an internal combustion engine, wherein the internal combustion engine includes a plurality of superchargers, and air fed from the superchargers are combined and supplied to the internal combustion engine, the apparatus comprising:
   a detecting device for detecting boost condition of each of the superchargers, the detecting device including at least two of a pressure ratio detecting unit, which detects the ratio of the pressure downstream each supercharger to the pressure upstream each supercharger, an air flow rate detecting unit, which detects the flow rate of air passing through each supercharger, and a rotational speed detecting unit, which detects the rotational speed of each supercharger;
   a determining unit, which determines whether the boost condition is within a predetermined surging area; and
   a control unit, when it is determined that the boost condition of only part of the superchargers is within the surging area, the control unit increases the air flow rate of the supercharger, the boost condition of which is determined to be in the surging area,
   wherein the engine includes intake passages each of which corresponds to one of the superchargers, the pressure ration detecting unit comprising:
   an atmospheric pressure detecting unit, which detects the atmospheric pressure;
   a pressure detecting unit, which detects the pressure in the intake passages downstream the superchargers; and
   a pressure ratio computing unit, which computes the ratio of the pressure downstream the superchargers to the atmospheric pressure.

2. The control apparatus according to claim 1, wherein the boost condition is represented by a coordinate in a two-dimensional coordinate system defined by the pressure ratio and the air flow rate, the coordinate system includes a surging line, which divides the coordinate system into a surging area and a non-surging area, and the surging line is set such that under the same pressure ratio, the value of the air flow rate in the surging area is smaller than that in the non-surging area, and under the same air flow rate, the value of the pressure ratio included in the surging area is greater than that in the non-surging area.

3. The control apparatus according to claim 1, wherein the detecting device includes the pressure ratio detecting unit and the air flow rate detecting unit, and the boost condition is represented by the pressure ratio and the air flow rate.

4. The control apparatus according to claim 1, wherein, when it is determined that the boost condition of only part of the superchargers is within the surging area, the control unit decreases the air flow rate of the supercharger, the boost condition of which is determined to be not in the surging area.

5. The control apparatus according to claim 1, wherein the superchargers are operated by exhaust gas flow, the superchargers are variable nozzle type having a vane the opening degree of which is variable, and the control unit increases the air flow rate of the supercharger by decreasing the opening degree of the vane and decreases the air flow rate of the supercharger by increasing the opening degree of the vane.

6. A supercharge control apparatus for an internal combustion engine, wherein the internal combustion engine includes a plurality of superchargers, and air fed from the superchargers are combined and supplied to the internal combustion engine, the apparatus comprising:
   a detecting device for detecting boost condition of each of the superchargers, the detecting device including at least two of a pressure ratio detecting unit, which detects the ratio of the pressure downstream the supercharger to the pressure upstream the supercharger, an air flow rate detecting unit, which detects the flow rate of air passing through each supercharger, and a rotational speed detecting unit, which detects the rotational speed of each supercharger;
   a determining unit, which determines whether the boost condition is within a predetermined surging area; and
   a control unit, when it is determined that the boost condition of only part of the superchargers is within the surging area, the control unit decreases the air flow rate of the supercharger other than the part of the superchargers the boost condition of which is determined to be in the surging area,
   wherein the engine includes intake passages each of which corresponds to one of the superchargers, the pressure ratio detecting unit comprising:
   an atmospheric pressure detecting unit, which detects the atmospheric pressure;
   a pressure detecting unit, which detects the pressure in the intake passages downstream the superchargers; and
   a pressure ratio computing unit, which detects the ratio of the pressure downstream the superchargers to the atmospheric pressure.

7. The control apparatus according to claim 6, wherein the boost condition is represented by a coordinate in a two-dimensional coordinate system defined by the pressure ratio and the air flow rate, the coordinate system includes a surging line, which divides the coordinate system into a surging area and a non-surging area, and the surging line is set such that under the same pressure ratio, the value of the air flow rate in the surging area is smaller than that in the non-surging area, and under the same air flow rate, the value of the pressure ratio included in the surging area is greater than that in the non-surging area.

8. The control apparatus according to claim 6, wherein the detecting device includes the pressure ratio detecting unit and the air flow rate detecting unit, and the boost condition is represented by the pressure ratio and the air flow rate.

9. The control apparatus according to claim 6, wherein the superchargers are operated by exhaust gas flow, the superchargers are variable nozzle type having a vane the opening degree of which is variable, and the control unit increases the air flow rate of the supercharger by decreasing the opening degree of the vane and decreases the air flow rate of the supercharger by increasing the opening degree of the vane.

10. A supercharge control method for an internal combustion engine, which includes a plurality of superchargers, the method comprising:
   combining air fed from the superchargers and supplying the air to the internal combustion engine;
   detecting a parameter representing boost condition of each of the superchargers, wherein the parameter includes at least two of the ratio of the pressure downstream each supercharger to the pressure upstream each supercharger, the flow rate of air passing through each supercharger, and the rotational speed of each supercharger;

determining whether the boost condition is within a predetermined surging area; and when it is determined that the boost condition of only part of the superchargers is within the surging area, increasing the air flow rate of the supercharger, the boost condition of which is determined to be in the surging area, the method further comprising:

detecting the atmospheric pressure;

detecting the pressure at a portion downstream each of the supercharger; and computing the ratio of the pressure downstream each supercharger to the atmospheric pressure.

11. The control method according to claim 10, wherein the parameter includes the pressure ratio and the air flow rate, the control method further comprising:

obtaining the boost condition in accordance with the pressure ratio and the air flow rate.

12. The control method according to claim 10, further comprising, when it is determined that the boost condition of only part of the superchargers is within the surging area, decreasing the air flow rate of the supercharger, the boost condition of which is determined to be not in the surging area.

13. The control method according to claim 10, wherein the superchargers are variable nozzle type having a vane the opening degree of which is variable, the control method further comprising:

operating the superchargers by exhaust gas flow; and increasing the air flow rate of the supercharger by decreasing the opening degree of the vane.

14. A supercharge control method for an internal combustion engine, which includes a plurality of superchargers, the method comprising:

combining air fed from the superchargers and supplying the air to the internal combustion engine;

detecting a parameter representing boost condition of each of the superchargers, wherein the parameter includes at least two of the ratio of the pressure downstream each supercharger to the pressure upstream each supercharger, the flow rate of air passing through each supercharger, and the rotational speed of each supercharger;

determining whether the boost condition is within a predetermined surging area; and when it is determined that the boost condition of only part of the superchargers is within the surging area, decreasing the air flow rate of the supercharger other than the part of the superchargers the boost condition of which is determined to be in the surging area, the method further comprising:

detecting the atmospheric pressure;

detecting the pressure at a portion downstream each of the superchargers; and computing the ratio of the pressure downstream each supercharger to the atmospheric pressure.

15. The control method according to claim 14, wherein the parameter includes the pressure ratio and the air flow rate, the control method further comprising:

obtaining the boost condition in accordance with the pressure ratio and the air flow rate.

16. The control method according to claim 14, wherein the superchargers are variable nozzle type having a vane the opening degree of which is variable, the control method further comprising:

operating the superchargers by exhaust gas flow; and decreasing the air flow rate of the supercharger by increasing the opening degree of the vane.

* * * * *

UNITED STATES PATENT AND TRADEMARK OFFICE
CERTIFICATE OF CORRECTION

| | | |
|---|---|---|
| PATENT NO. | : 7,066,157 B2 | |
| APPLICATION NO. | : 11/021665 | |
| DATED | : June 27, 2006 | |
| INVENTOR(S) | : Yoshiyuki Yakahashi et al. | |

It is certified that error appears in the above-identified patent and that said Letters Patent is hereby corrected as shown below:

<u>Column 2,</u>
Line 26, delete "unit. when it is" and insert -- unit. When it is --.

<u>Column 9,</u>
Line 7, delete "replaced with steps S1, S12." and insert -- replaced with steps S11, S12. --.
Line 29, delete "decreases the air flow-rate" and insert -- decreases the air flow rate --.

Signed and Sealed this

Nineteenth Day of June, 2007

JON W. DUDAS
*Director of the United States Patent and Trademark Office*